United States Patent
Graves

(10) Patent No.: US 7,159,701 B2
(45) Date of Patent: Jan. 9, 2007

(54) AUTOMATIC DRAG BRAKE FOR A POWER TAKE-OFF UNIT OUTPUT SHAFT

(75) Inventor: Damon Byron Graves, Bartlett, TN (US)

(73) Assignee: Parker Hannifin Corporation, Cleveland, OH (US)

( * ) Notice: Subject to any disclaimer, the term of this patent is extended or adjusted under 35 U.S.C. 154(b) by 7 days.

(21) Appl. No.: 10/850,552

(22) Filed: May 20, 2004

(65) Prior Publication Data

US 2005/0258012 A1    Nov. 24, 2005

(51) Int. Cl.
*F16D 67/04*    (2006.01)

(52) U.S. Cl. .................. 192/18 A; 74/15.86; 192/12 C

(58) Field of Classification Search ............... 192/18 A
See application file for complete search history.

(56) References Cited

U.S. PATENT DOCUMENTS

| | | | |
|---|---|---|---|
| 3,035,458 A | | 5/1962 | Wickman |
| 3,295,394 A | * | 1/1967 | Whateley ................. 192/18 A |
| 3,872,954 A | | 3/1975 | Nordstrom et al. |
| 4,175,649 A | | 11/1979 | Monks |
| 4,310,080 A | | 1/1982 | Jarvis et al. |
| 4,567,965 A | | 2/1986 | Woodruff |
| 4,573,366 A | * | 3/1986 | Kennard ................... 74/15.86 |
| 4,706,520 A | | 11/1987 | Sivalingam |
| 5,139,579 A | * | 8/1992 | Kovacs et al. ............... 148/545 |
| 5,437,355 A | | 8/1995 | Takagi et al. |
| 5,542,306 A | | 8/1996 | Fernandez |
| 5,868,019 A | * | 2/1999 | Grabbe ........................... 72/4 |
| 5,893,443 A | * | 4/1999 | Olmr ........................ 192/66.31 |
| 6,015,032 A | * | 1/2000 | McGourthy et al. ...... 192/18 R |
| 6,131,714 A | * | 10/2000 | Bosl et al. ................. 192/18 A |
| 6,142,274 A | | 11/2000 | Warner |
| 6,305,515 B1 | * | 10/2001 | Heidenreich et al. ..... 192/18 A |
| 6,497,313 B1 | | 12/2002 | Blalock |
| 2005/0016304 A1 | * | 1/2005 | Ishii et al. ................... 74/15.4 |

* cited by examiner

Primary Examiner—Rodney H. Bonck
(74) Attorney, Agent, or Firm—Daniel J. Whitman; Joseph J. Pophal

(57) ABSTRACT

Improvement in a drag brake assembly for a power take-off unit, for use on trucks and the like, including a first reaction member axially located on an output shaft thereon; a brake disc rotatably affixed to and axially movable on the output shaft; a second reaction member forming an inner surface portion of one of the bearing caps; and a spring member interposed between the first reaction member and the brake disc, for normally biasing the brake disc into an engaged position wherein the brake disc engages the second reaction member inner surface portion, with the brake disc including a first frusto-conical outer surface portion and the second reaction member inner surface being provided with a complementary second frusto-conical surface, with the engagement therebetween keeping the output shaft from rotating.

17 Claims, 3 Drawing Sheets

AUTOMATIC DRAG BRAKE FOR A POWER TAKE-OFF UNIT OUTPUT SHAFT

FIELD OF THE INVENTION

The present invention pertains to a power take-off unit, for use on trucks and the like, including a fluid pressure actuated clutch assembly for selectively driving a vehicle accessory from a source of rotational power, such as a prime mover or transmission. More particularly, the invention pertains to an improved drag brake assembly that is automatically engaged when an associated fluid pressure actuated clutch assembly is disengaged, and further that is automatically disengaged when the clutch assembly is engaged.

BACKGROUND OF THE INVENTION

Power take-off (PTO) units are well known in the art and most commonly used with sources of rotational power, such as engines and transmissions, for rotatably driving an accessory such as a pump which, in turn then operates any number of hydraulically driven devices such as lifting devices, winches, and the like.

Frequently, the PTO unit further includes a clutch assembly, generally of the fluid pressure actuated type, for selectively disconnecting the output shaft from the input gear, thus permitting selective and/or intermittent operation of the driven accessory without having to stop the vehicle engine. Thus, when the clutch assembly is engaged, the output shaft is rotatably driven by the input. Conversely, when the clutch assembly is disengaged, the output shaft is decoupled from the input gear and the driven device is not operated by the engine, etc.

Since operation of the PTO unit can generate undesirable friction and heat, the PTO unit is generally provided with a considerable quantity of lubricating fluid. However, it has been determined that the relatively viscous nature of the lubricating fluid can cause the output shaft to continue to be at least partially rotatably driven, even though the clutch assembly has been disengaged. This is particularly the case during cold weather operation when the lubricating fluid is cold and viscous, such as when the vehicle is initially started. Naturally, such rotation of the output shaft of the PTO unit, after the clutch assembly has been disconnected, is undesirable.

This noted problem has been addressed in the prior art by the addition to the PTO unit output shaft, of a brake system, such as a drag brake assembly. One such prior art device, namely the automatically actuated drag brake assembly set forth in U.S. Pat. No. 6,497,313 B1, to Blalock, which is also assigned to the assignee of the present invention, utilizes a brake piston that is coaxially aligned with an end face of the output shaft and is normally urged into frictional end abutment therewith via a wave spring interposed between one end of the piston and an adjacent bearing end cap, thereby braking the output shaft. A fluid pressure operated clutch, interposed between the input gear and the output shaft, upon actuation, overcomes the bias of the spring and thus couples the output shaft to the input gear. While workable, it has been determined that the available frictional braking surface is not sufficient to ensure complete rotational stoppage of the output shaft under all operating conditions. Thus, the present invention sets forth an improved automatic drag brake for a PTO unit output shaft that overcomes the noted insufficient stopping power of this prior art device.

The patent literature includes a large number of PTO unit drag brake devices as well as devices that utilize frictionally engaging cone-type brake members and additionally include: U.S. Pat. No. 3,035,458 to Wickman; U.S. Pat. No. 3,872,954 to Nordstrom et al.; U.S. Pat. No. 4,175,649 to Monks; U.S. Pat. No. 4,310,080 to Jarvis et al.; U.S. Pat. No. 4,567,965 to Woodruff; U.S. Pat. No. 4,706,520 to Sivalingam; U.S. Pat. No. 5,437,355 to Tagaki; U.S. Pat. No. 5,542,306 to Fernandez; and U.S. Pat. No. 6,142,274 to Warner. However, none of these prior art structures, pertains to the use of a cone-type brake, having interacting truncating frusto-conical mating surfaces, where the stationary reaction member, having one of the noted frusto-conical surfaces, is located on the inner surface of the inside diameter of one of the PTO unit bearing end caps.

SUMMARY OF THE INVENTION

Accordingly, in order to overcome the deficiencies of the prior art devices, the present invention provides an improved drag brake that not only utilized large diameter cone-type interacting brake surfaces, but also utilizes the surface of the inside diameter of one of the bearing end caps as the stationary reaction surface. This construction maximizes the available braking surface, while reducing the space requirement for the brake assembly, as well as reducing the associated manufacturing cost and simplifying the overall structure.

Specifically, in terms of structure, in this invention, a power take-off includes: a rigid housing; a first bearing end cap located on one end of the housing; a second bearing end cap located on another end of the housing; an input gear rotatably journalled, relative to the housing, between the end caps; an output shaft, rotably journalled in the end caps, within the housing and extending from one of the end caps; a clutch assembly connected between the input gear and the output shaft, the clutch assembly being operable in either an engaged condition, wherein the input gear is connected to drive the output shaft, or a disengaged condition, wherein the input gear is not connected to drive the output shaft, the clutch assembly being responsive to the application of pressurized fluid for being operated in the engaged condition; a drag brake assembly being operable in either an engaged condition, wherein the drag brake assembly retards rotation of the output shaft, or a disengaged position, wherein the drag brake does not retard rotation of the output shaft, the drag brake assembly being responsive to the application of pressurized fluid for being operated in the disengaged condition; and a conduit for selectively applying pressurized fluid to both the clutch assembly and the drag brake assembly, an improvement in the drag brake assembly comprising:

a. a first reaction member located on the output shaft;
   b. a driven member rotatably affixed but axially movable relative to the output shaft;
   c. second reaction member forming a portion of one of the bearing end caps; and
   d. spring member, interposed between the first reaction member and the driven member for biasing the driven member into the engaged position wherein the driven member frictionally engages the second reaction member, thereby retarding rotation of the output shaft.

In one variation, the driven member is an annular brake disc having a first frusto-conical outer surface portion, wherein said first frusto-conical outer surface portion is preferably continuous.

In another variation, the second reaction member takes the form of an inner surface portion of one of the bearing end caps, wherein the inner surface portion is a second frusto-conical inner surface portion, substantially complementary with the first frusto-conical surface portion and preferably continuous.

In a further version, the driven member includes a cone-type outer surface portion, wherein the cone-type outer surface portion is preferably continuous.

In still another version, the second reaction member takes the form of a cone-type inner surface portion on one of the bearing end caps, said inner surface portion thereof being substantially complementary with said outer surface portion and preferably is continuous.

In one version, the second reaction member is located in said first bearing end cap, while in another version the second reaction member is located in the second bearing end cap.

In a further version, one of the first and second bearing end caps includes a central aperture, with one end of the output shaft extending therethrough.

In still another version, the driven member takes the form of an annular brake disc having a central hub portion that is axially movable relative to the output shaft, with the central hub portion including an axial slot and the output shaft including a radially-extending pin portion, the pin portion freely extending into the slot and thereby coupling the brake disc for conjoint rotation with the output shaft while simultaneously permitting axial movement of said brake disc via axial movement of the slot portion relative to the pin.

In yet a different version, the driven member takes the form of an annular brake disc having a cylindrical axial extension on one side thereof which, together with an adjacent portion of the output shaft forms an annular chamber.

An added version further includes a generally cylindrical brake piston, having a hub portion located on the output shaft, adapted to move axially with respect thereto while sealingly fitting within the annular chamber, with the brake piston being movable between an engaged position, wherein an annular cavity, between the brake disc and the brake piston, is pressurized, and a disengaged position, wherein the annular cavity is not pressurized.

In another version, in the engaged position, the pressurized fluid overcomes the bias of the spring member, thereby axially moving the brake disc out of contact with the second reaction member and thus permitting rotation of the output shaft.

In yet a differing version, in the disengaged position, the bias of the spring member overcomes the fluid pressure within the cavity, thereby axially moving the brake disc into contact with the second reaction member and thus retarding rotation of the output shaft.

In a further power take-off unit of this invention, including: a rigid housing; a first bearing end cap closing one end of the housing; a second bearing end cap closing an opposing end of the housing; an input member rotatably journalled relative to the housing, intermediate the end caps; an output shaft, within the housing, rotatably journalled in the end caps; a fluid pressure activated clutch assembly, connected between the input member and the output shaft, operative in both an engaged position and a disengaged position, for selectively coupling the input member to the output shaft; a fluid pressure diengaged drag brake assembly, interposed between the output shaft and one of the first and second bearing end caps, for selectively coupling the output shaft to the one bearing end cap; and a conduit, for selectively and simultaneously applying pressurized fluid to both the clutch and brake assemblies; an improvement in the drag brake assembly comprising:

a. a first reaction member axially located on the output shaft;
b. a brake disc rotatably affixed to and axially movable on the output shaft;
c. second reaction member forming an inner surface portion of one of said bearing end caps; and
d. a spring member, interposed between the first reaction member and the brake disc, for normally biasing the brake disc into an engaged position wherein the brake disc engages the second reaction member, thereby keeping the output shaft from rotating.

In a further version, the brake disc includes a first frusto-conical outer surface portion and the noted inner surface portion is provide with a second frusto-conical surface adapted to frictionally engage the first frusto-conical surface portion. Preferably the first and second frusto-conical surface portions are substantially complementary.

In yet other versions, the second reaction member forms a part of one of the first and second reaction members, respectively.

In a final version, the one bearing end cap is formed of cast iron while the brake disc is formed of heat-treated cast iron.

The previously-described advantages and features, as well as other advantages and features, will become readily apparent from the detailed description of the preferred embodiments that follow.

DETAILED DESCRIPTION OF THE INVENTION

Figure 1:
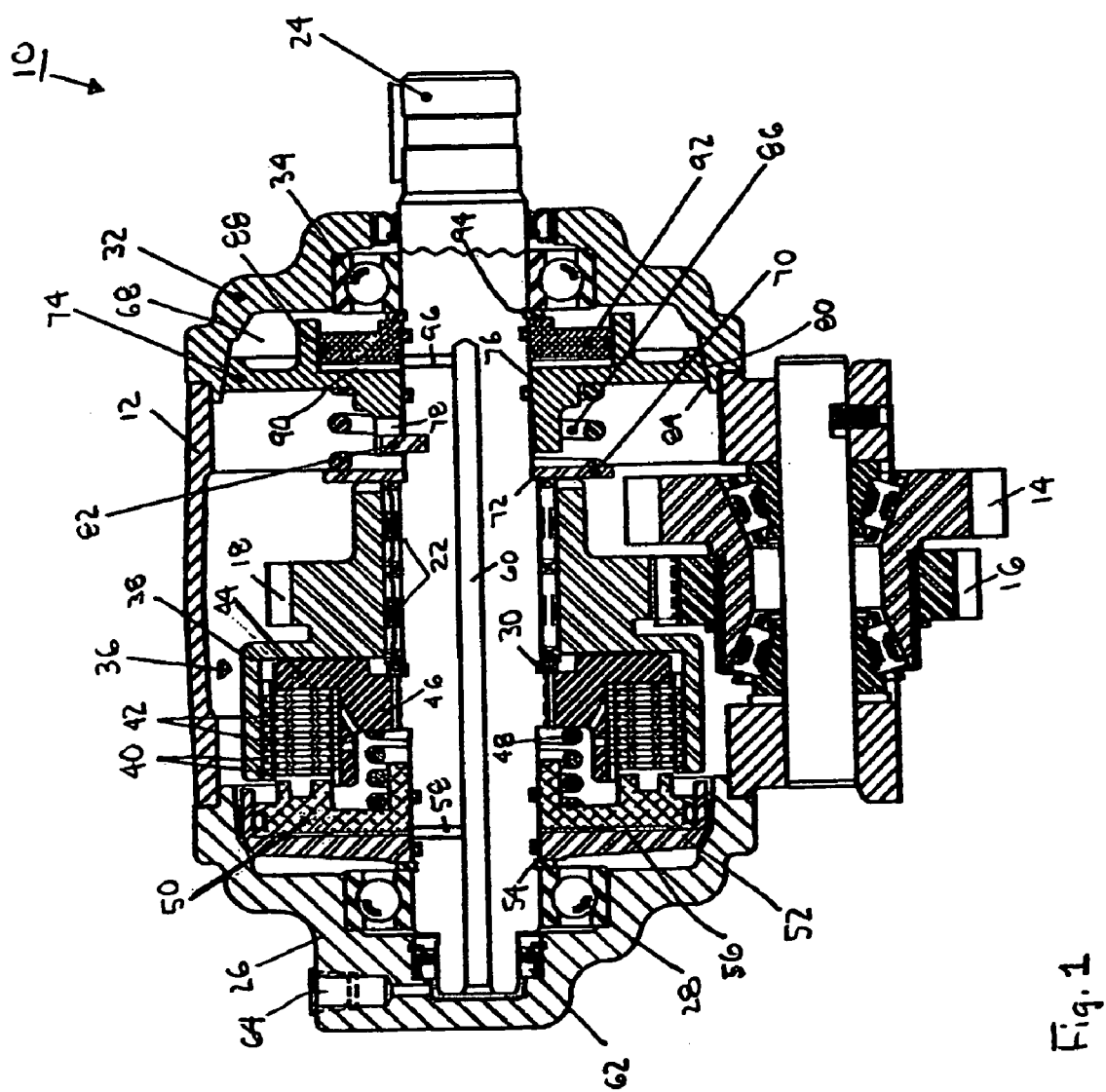
FIG. 1 is a sectional elevational view of the power take-off unit in accordance with this invention, with the clutch assembly being disengaged while the drag brake assembly is engaged.

Referring now to the several drawings, illustrated in FIG. 1 is a power take-off (PTO) unit, generally indicated at 10. Since the basic structure, mode of operation and function of PTO unit 10 are well known in the art, in the interest of brevity, only those portions thereof that are necessary for a complete understanding of the invention will be described in detail hereinafter. PTO unit 10 includes a rigid housing 12 that contains a rotatably journalled outside driving gear 14 operatively coupled to an input gear 16, which in turn is in meshed engagement with an inside drive gear 18 that is rotatably journalled, such as via adjacent needle bearings 22, on an output shaft 24. One end of output shaft 24 is rotatably journalled via conventional rolling element bearings 28 located within a recess in a first or closed bearing cap 26 secured to one side of PTO housing 12, with the other end of output shaft 24 being similarly journalled, via bearing 34 located within a recess formed in a second or open end bearing cap 32 secured to another side of PTO housing 12.

As is well known in the art, outside drive gear 14 is adapted to be operatively connected to a prime mover or a transmission (neither shown) and is rotatably driven in a conventional manner. Output shaft 24 is adapted to be connected to a rotatably driven accessory, such as a hydraulic pump (not shown), in a known manner.

PTO unit 10 also includes a known clutch assembly 36 for selectively providing a driving connection between outside drive gear 14 and output shaft 24. Clutch assembly 36 includes previously-noted inside drive gear 18 which in turn includes an axially-extending hollow cylindrical bell or cup portion 38 having a splined inner surface portion. A plurality of flat annular clutch plates 40 is splined to the inner splined surface portion of bell portion 38 for rotation therewith. Thus, inside drive gear 18 and clutch plates 40 are adapted to be rotatably driven, as a unit, by outside drive gear 14, via input gear 16.

A further plurality of flat annular friction plates 42 is alternately disposed between clutch plates 40, with friction plates 42 being splined to an outer surface of an axially extending portion 46 of a clutch member 44 for rotation therewith. Clutch member 44 is, in turn secured, such as via splines, to output shaft 24 for rotation therewith. Thus, friction plates 42, clutch plates 40, and output shaft 24 are connected for conjoint rotation, as a unit. Clutch member 44 is restrained from axial movement, in one direction (toward internal drive gear 18), by at least one retainer ring 30, mounted on output shaft 24.

Thus, it should be understood that clutch plates 40, together with friction plates 42, form a portion of clutch assembly 36 for PTO unit 10. A generally annular clutch piston 50 selectively causes clutch plates 40 and friction plates 42 to frictionally inter-engage, thereby actuating clutch assembly 36. This is accomplished by having clutch piston 50 disposed within a hollow cup-shaped cylindrical clutch cylinder 52, with one end of clutch piston 50 being disposed within clutch cylinder 52 while the other end thereof extends from an open end of clutch cylinder 52, adjacent to interleaved clutch plates 40 and friction plates 42. Both clutch piston 50 and clutch cylinder 52 are supported on output shaft 24. While clutch piston 50 is axially movable, relative to output shaft 24, clutch cylinder 52 is restrained from axial movement, in one direction, by at least one retaining ring 54 mounted on output shaft 24.

A coil spring 48, surrounding output shaft 24, reacts between clutch piston 50 and clutch member 44 to urge clutch piston 50 toward a disengaging position, adjacent to a closed end of clutch cylinder 52 such that clutch piston 50 does not engage clutch plates 40 and friction plates 42, resulting in clutch member 44 being disconnected from inside drive gear 18 in a manner well known in the art.

An annular clutch chamber 56 is defined between clutch piston 50 and a closed end of clutch cylinder 52. Clutch chamber 56 communicates, via a radial or transverse passageway 58 and an axial passageway 60, both of which are located within output shaft 24, with an annular end chamber 62 formed within a portion of first or closed end bearing cap 26, with chamber 62 in turn being connected with a pressure port 64, for a purpose to be explained hereinafter.

Turning now to the portion of output shaft 24 extending toward and through second or open end cap 34, located on shaft 24, adjacent to inside drive gear 18 and its associated needle bearings 22, is one embodiment of the improved drag brake assembly 68 of this invention. Drag brake assembly 68 includes a reaction member 70 that is axially affixed, in one direction, by abutting a step 72 on shaft 24. Also located on shaft 24 and abutting one side of reaction member 70 is a generally annular driven member or brake disc 74 having a central hub portion 76 that is axially movable, relative to shaft 24, for a distance determined, at least in one direction, by the length of an axial slot 78 in hub portion 76. A transversely-extending retainer pin 82, extending from output shaft 24, rides in slot 78 and couples brake disc 74 to shaft 24 while also permitting the previously-noted axial movement of brake disc 74.

A further coil spring 86, surrounding output shaft 24, reacts between reaction member 70 and brake disc 74, to urge brake disc 74 toward an engaged position, wherein a frusto-conical outer surface portion 80, of brake disc 74, frictionally operatively engages a corresponding or complementary frusto-conical inner surface portion 84 of second or open ended bearing end cap 32, thus acting as a second reaction member, as best seen in FIG. 1.

Brake disc 74 also includes a cylindrical axial extension 88 on the side thereof opposite from hub portion 76 which, together with output shaft 24, defines an annular cavity or chamber 90 that serves to house a generally annular brake piston 92 whose hub portion is located on output shaft 24. The axial movement of brake piston 92, in at least one direction, is restrained by a retaining ring 94 in output shaft 24, at rolling element bearing 34. Terminating into piston cavity 90 is one end of another transverse or radial passageway 96, in output shaft 24, whose other end is in communication with output shaft axial passageway 60. Pressure port 64, in bearing end cap 26, is adapted to be connected to a source of pressurized fluid (not shown) in a conventional manner so as to selectively provide pressurized fluid (hydraulic or pneumatic) to first or closed bearing end cap annular end chamber 62 and, by virtue of axial passageway 60 and radial passageways 58 and 96, to annular clutch chamber 56 and annular brake chamber 90, respectively.

Since PTO unit 10 is normally completely filled with lubricant, which is common in the art, in order to permit the free flow thereof, within PTO unit 10, brake disc 74 is preferably provided with a plurality of slots 98 (best seen in FIG. 3) through its surface in the region radially intermediate its cylindrical extension 88 and its frusto-conical outer surface portion 80. Another alternative for achieving the free flow of lubricant within PTO unit 10 is to interrupt the continuity of either frusto-conical inner surface 84 of bearing end cap 32, or the frusto-conical outer surface 80 of brake disc 74, with the at least one axial recess or slot (neither shown). Drag brake assembly 68, together with the frusto-conical inner surface 84 of second or open bearing end cap 32, are also known as a "cone" friction brake by virtue of its frictionally interacting conical braking or mating surfaces. Bearing caps 32 and 26 are preferably comprised of cast iron while brake disc 74 is preferably comprised of heat-treated cast iron. While generally smooth mating surface finishes are preferred, no additional intermediate friction material layers or coatings are required.

Based on the previous description, it should be evident that clutch coil spring 48, in clutch assembly 36, serves to normally bias clutch plates 40 and friction plates 42 to a disengaged position or state while brake coil spring 86, in drag brake assembly 68, serves to normally bias brake disc 74 to an engaged state or position with end cap 32, thereby normally or automatically braking PTO unit output shaft 24 while PTO unit 10 is disengaged.

The overall operation of PTO unit 10 will now be briefly described. Once the vehicle engine has been started, outside drive gear 14 is rotatably driven, which in turn, via input gear 16, causes inside drive gear 18 to freely rotate around output shaft 24. Assuming, that the source of pressurized fluid has not been activated, there is no pressurized fluid in any one of end cap annular chamber 62, the passageways 58, 60 and 96 or within clutch chamber 56 and brake chamber 90. Therefore, as seen in FIG. 1, clutch assembly 36 is maintained in its normally disengaged position under the influence of clutch spring 48. At the same time, brake disc 74 is urged into its normally engaged position under the influence of brake spring 86, thereby affirmatively preventing output shaft 24 from rotating.

Figure 2:
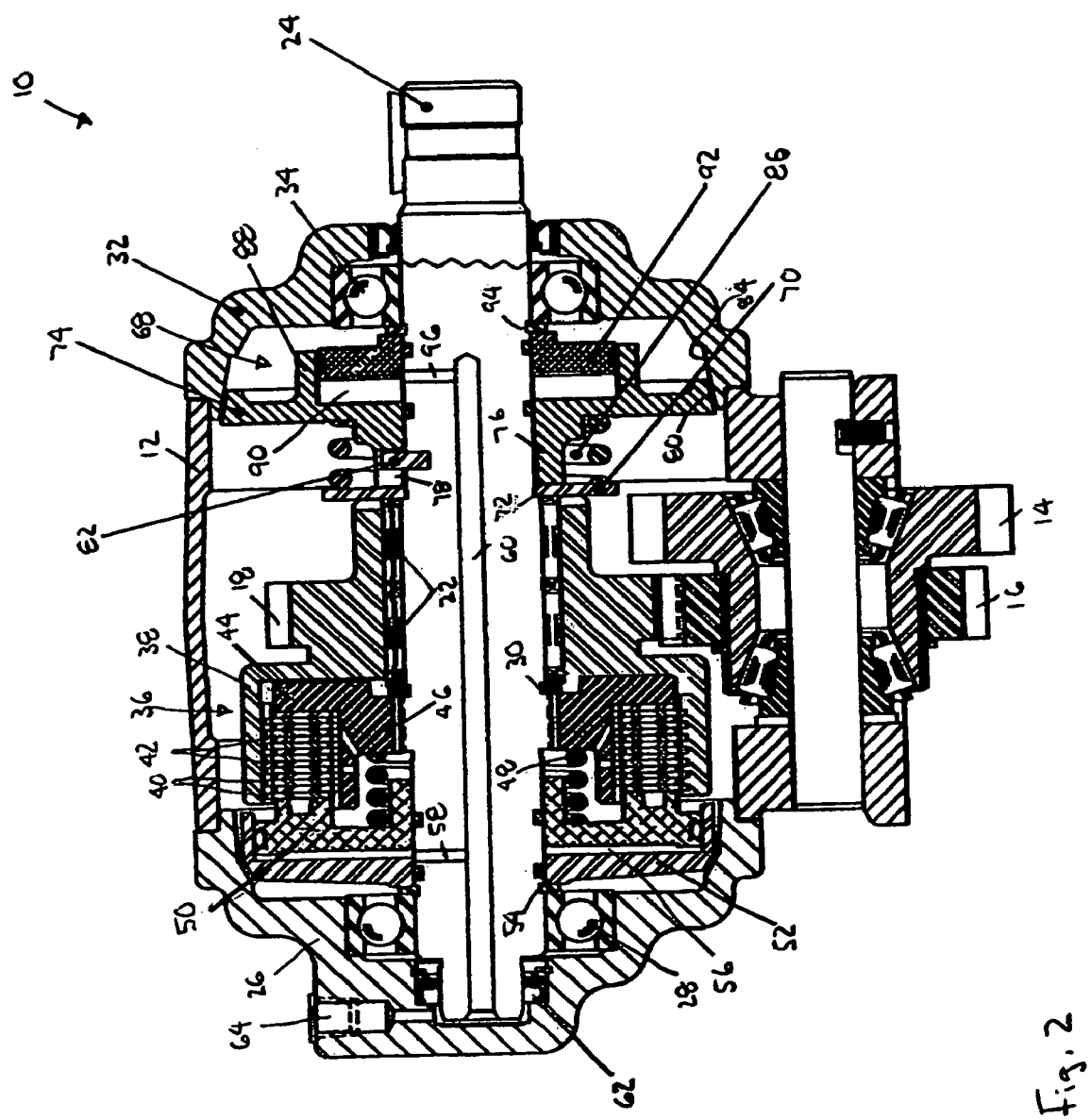
FIG. 2 is a sectional elevational view, similar to that of FIG. 1, with the clutch assembly being engaged while the drag brake assembly is disengaged.

When it is desired to engage PTO unit 10, in order to operate a driven device (not shown), the source of pressurized fluid is actuated to supply pressurized fluid through pressure port 64, annular end chamber 62 and conduits or passageways 60, 58 and 96 to clutch chamber 56 and brake chamber 90. When this occurs, as illustrated in FIG. 2, the fluid pressure within clutch chamber 56 overcomes the bias or force of clutch spring 48 and moves clutch piston 50 into engagement with interleaved clutch and friction plates 40, 42, respectively, thereby engaging clutch assembly 36 in a known manner and causes output shaft 24 to rotate. Simultaneously, the fluid pressure in brake cavity 90 overcomes the bias or force of brake spring 86 and moves brake disc 74 out of frictional engagement with frusto-conical inner surface 84 of bearing end cap 32, thereby freeing output shaft 24 to be rotatably driven by outside drive gear 14 in the manner previously described.

Figure 3:
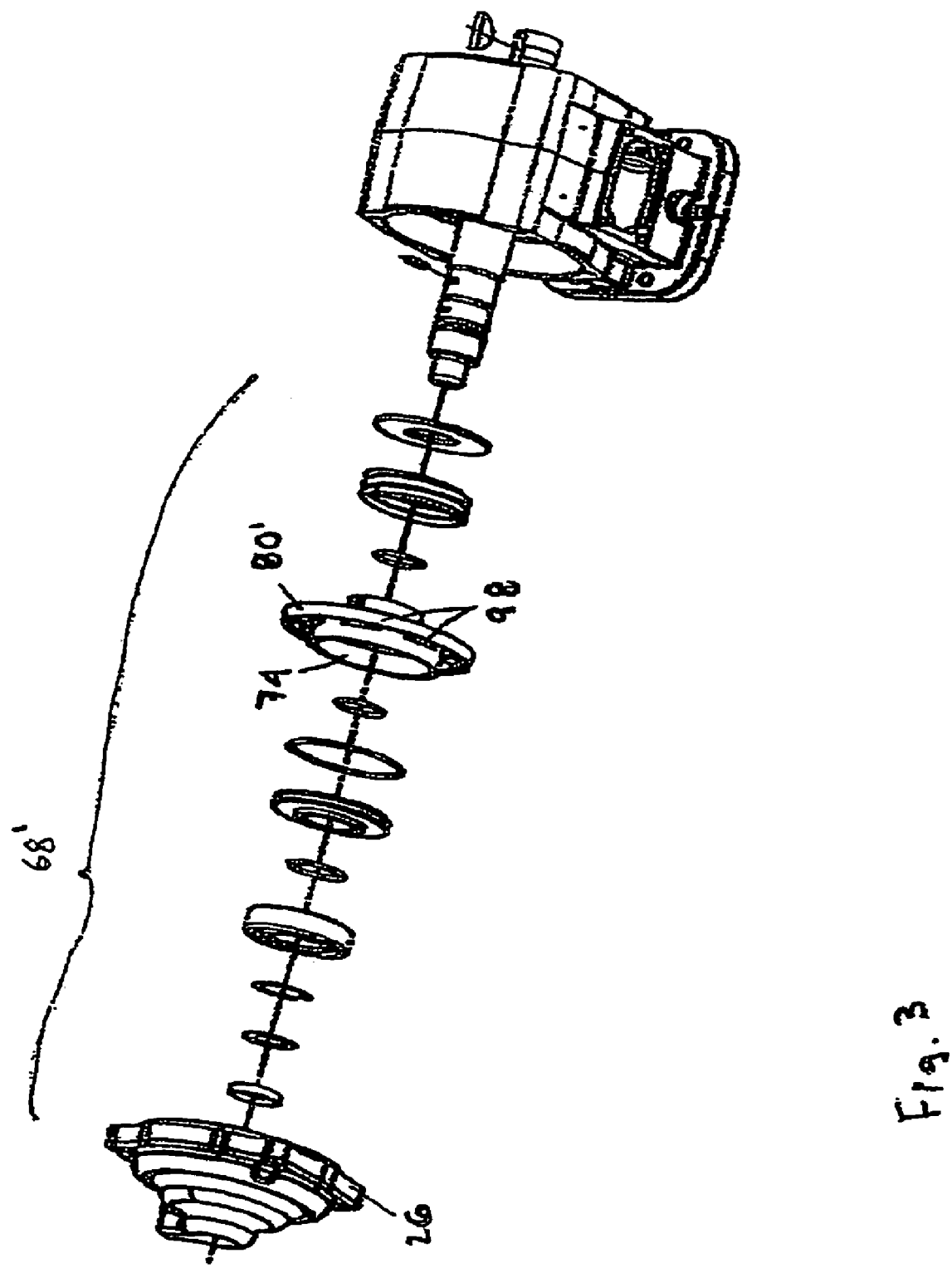
FIG. 3 is an exploded view of another embodiment the drag brake assembly of this invention.

It should be understood that, if desired, rather than placing or locating cone-type drag brake assembly 68 at open end bearing cap 32, as is illustrated in FIGS. 1 and 2, brake assembly 68' can also be placed or located at closed end bearing cap 26. This is schematically illustrated in FIG. 3 which is an exploded view of another embodiment of cone-type brake assembly 68', located at closed end bearing cap 26 instead of open end bearing cap 32. All brake parts or components remain the same, though reversed relative to FIGS. 1 and 2, except that an inner surface portion of bearing cap 26 is now provided with a frusto-conical inner surface portion 84' (not shown), acting as a second reaction member, that mates with frusto-conical brake disc surface portion 80'. Clutch assembly 36 (not shown in FIG. 3), is reversed and relocated adjacent to open end bearing cap 34 in a manner well known in the art. The operation of the revised PTO unit of FIG. 3 remains substantially similar to that of PTO unit 10 illustrated in FIGS. 1 and 2.

It is deemed that one of ordinary skill in the art will readily recognize that the present invention fills remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. In a power take-off including:
   a. a rigid housing;
   b. a first bearing end cap located on one end of said housing;
   c. a second bearing end cap located on another end of said housing;
   d. an input gear rotatably journalled, relative to said housing, between said end caps;
   e. an output shaft, rotatably journalled in said end caps, within said housing and extending from one of said end caps;
   f. a clutch assembly connected between said input gear and said output shaft, said clutch assembly being operable in either an engaged condition, wherein said input gear is connected to drive said output shaft, or a disengaged condition, wherein said input gear is not connected to drive said output shaft, said clutch assembly being responsive to the application of pressurized fluid for being operated in said engaged condition;
   g. a drag brake assembly being operable in either an engaged condition, wherein said drag brake assembly retards rotation of said output shaft, or a disengaged position, wherein said drag brake does not retard rotation of said output shaft, said drag brake assembly being responsive to the application of pressurized fluid for being operated in said disengaged condition; and
   h. a conduit for selectively applying pressurized fluid to both said clutch assembly and said drag brake assembly, an improvement in said drag brake assembly comprising:
   i. a first reaction member located on said output shaft;
   j. a driven member rotatably affixed but axially movable relative to said output shaft;
   k. a second reaction member, said second reaction member being said first bearing end cap, a portion of an inner surface of said first bearing end cap being frusto-conical and adapted to engage said driven member when said drag brake assembly is in said engaged condition to retard rotation of said output shaft; and
   l. a spring member, interposed between said first reaction member and said driven member for biasing said driven member into engagement with said second reaction member, thereby retarding rotation of said output shaft, wherein said driven member takes the form of an annular brake disc having a cylindrical axial extension on one side thereof which, together with an adjacent portion of said output shaft forms an annular chamber.

2. The improved drag brake assembly of claim 1, wherein said annular brake disc has a first frusto-conical outer surface portion.

3. The improved drag brake assembly of claim 2, wherein said first frusto-conical outer surface portion is circumferentially continuous.

4. The improved drag brake assembly of claim 1, wherein said frusto-conical inner surface portion of said first bearing end cap is substantially complementary with said first frusto-conical surface portion.

5. The improved drag brake assembly of claim 4, wherein said frusto-conical inner surface portion of said first bearing end cap is circumferentially continuous.

6. The improved drag brake assembly of claim 1, wherein said driven member includes a cone-type outer surface portion.

7. The improved drag brake assembly of claim 6, wherein said cone-type outer surface portion is circumferentially continuous.

8. The improved drag brake assembly of claim 6, wherein said frusto-conical inner surface portion of said first bearing end cap is substantially complementary with said cone-type outer surface portion.

9. The improved drag brake assembly of claim 8, wherein said frusto-conical inner surface portion is circumferentially continuous.

10. The improved drag brake assembly of claim 1, wherein one of said first and second bearing end caps includes a central aperture, with one end of said output shaft extending therethrough.

11. The improved drag brake assembly of claim 1, further including a generally cylindrical brake piston, having a hub portion located on said output shaft, adapted to move axially with respect thereto while sealingly fitting within said annular chamber.

12. The improved drag brake assembly of claim 11, wherein said brake piston is movable between an engaged position, wherein an annular cavity, between said brake disc and said brake piston, is not pressurized, and a disengaged position-, wherein said annular cavity is pressurized.

13. The improved drag brake assembly of claim 12, wherein in said disengaged position, said pressurized fluid overcomes the bias of said spring member, thereby axially moving said brake disc out of contact with said second reaction member and thus permitting rotation of said output shaft.

14. The improved drag brake assembly of claim 13, wherein in said engaged position, the bias of said spring member overcomes the fluid pressure within said cavity, thereby axially moving said brake disc into contact with said second reaction member and thus retarding rotation of said output shaft.

15. The improved drag brake assembly of claim 1, wherein said first bearing end cap is comprised of cast iron.

16. The improved drag brake assembly of claim 1, wherein said annular brake disc is comprised of heat-treated cast iron.

17. A power take-off including:
   a. a rigid housing;
   b. a first bearing end cap located on one end of said housing;
   c. a second bearing end cap located on another end of said housing;
   d. an input gear rotatably journalled, relative to said housing, between said end caps;
   e. an output shaft, rotatably journalled in said end caps, within said housing and extending from one of said end caps;
   f. a clutch assembly connected between said input gear and said output shaft, said clutch assembly being operable in either an engaged condition, wherein said input gear is connected to drive said output shaft, or a disengaged condition, wherein said input gear is not connected to drive said output shaft, said clutch assembly being responsive to the application of pressurized fluid for being operated in said engaged condition;
   g. a drag brake assembly being operable in either an engaged condition, wherein said drag brake assembly retards rotation of said output shaft, or a disengaged position, wherein said drag brake does not retard rotation of said output shaft, said drag brake assembly being responsive to the application of pressurized fluid for being operated in said disengaged condition; and
   h. a conduit for selectively applying pressurized fluid to both said clutch assembly and said drag brake assembly, an improvement in said drag brake assembly comprising;
   i. a first reaction member located on said output shaft;
   j. a driven member rotatably affixed but axially movable relative to said output shaft;
   k. a second reaction member, said second reaction member being said first bearing end cap, a portion of an inner surface of said first bearing end cap being frusto-conical and adapted to engage said driven member when said drag brake assembly is in said engaged condition to retard rotation of said output shaft; and
   l. a spring member, interposed between said first reaction member and said driven member for biasing said driven member into engagement with said second reaction member, thereby retarding rotation of said output shaft, wherein said driven member takes the form of an annular brake disc having a central hub portion that is axially movable relative to said output shaft and wherein said central hub portion includes an axial slot and said output shaft includes a radially-extending pin portion, said pin portion freely extending into said slot and thereby coupling said brake disc for conjoint rotation with said output shaft while simultaneously permitting axial movement of said brake disc via axial movement of said slot portion relative to said pin.

* * * * *